US005604353A

United States Patent [19]

Gibson et al.

[11] Patent Number: 5,604,353
[45] Date of Patent: Feb. 18, 1997

[54] MULTIPLE-CHANNEL, TOTAL-REFLECTION OPTIC WITH CONTROLLABLE DIVERGENCE

[75] Inventors: David M. Gibson, Voorheesville; Robert G. Downing, Albany, both of N.Y.

[73] Assignee: X-Ray Optical Systems, Inc., Albany, N.Y.

[21] Appl. No.: 489,503

[22] Filed: Jun. 12, 1995

[51] Int. Cl.[6] .............................. G21K 1/02; G01N 23/00

[52] U.S. Cl. .......................................... 250/505.1; 378/149

[58] Field of Search ........................ 250/505.1; 378/147, 378/149, 150; 313/103 CM

[56] References Cited

U.S. PATENT DOCUMENTS

| | | | |
|---|---|---|---|
| 3,997,794 | 12/1976 | York et al. | 378/150 |
| 4,143,273 | 3/1979 | Richey et al. | 378/150 |
| 4,277,684 | 7/1981 | Carson | 378/148 |
| 4,450,578 | 5/1984 | Hill | 378/150 |
| 4,741,012 | 4/1988 | Duinker et al. | 378/147 |
| 4,910,759 | 3/1990 | Sharnoff | 378/147 |
| 5,001,737 | 3/1991 | Lewis et al. | 378/147 |
| 5,016,267 | 5/1991 | Wilkins | 378/84 |
| 5,192,869 | 3/1993 | Kumakhov | 250/505.1 |
| 5,479,469 | 12/1995 | Fraser et al. | 250/505.1 |

FOREIGN PATENT DOCUMENTS 56-30295 of 1981 Japan .

*Primary Examiner*—Bruce C. Anderson
*Attorney, Agent, or Firm*—Heslin & Rothenberg, P.C.

[57] ABSTRACT

An apparatus and method for providing focused x-ray, gamma-ray, charged particle and neutral particle, including neutron, radiation beams with a controllable amount of divergence are disclosed. The apparatus features a novel use of a radiation blocking structure, which, when combined with multiple-channel total reflection optics, increases the versatility of the optics by providing user-controlled output-beam divergence.

18 Claims, 9 Drawing Sheets

MULTIPLE-CHANNEL, TOTAL-REFLECTION OPTIC WITH CONTROLLABLE DIVERGENCE

GOVERNMENT LICENSE RIGHTS

This invention was made with U.S. Government support under Contract No. DE-FG02-91ER81220 awarded by the Department of Energy. The Government has certain rights in this invention.

FIELD OF THE INVENTION

This invention relates broadly to the fields of x-ray, gamma-ray, charged particle and neutral particle, including neutron, optics. More particularly, this invention relates to multiple-channel, total-reflection optics. Specifically, this invention provides methods and devices for producing focused x-ray, gamma-ray, charged particle and neutral particle, including neutron radiation beams with a controllable amount of divergence.

BACKGROUND OF THE ART

Many different devices and methods have been developed which use x rays or neutrons as probes to investigate the structural or chemical properties, or elemental constituents of a sample. A significant problem with many of these devices is their lack of ability to obtain sufficient radiation intensities. A lack of radiation intensity causes measurement times to be longer than desirable, and can result in increased experimental noise. In some cases, where the sample to be investigated is unstable, long measurement times are not possible. In commercial applications, where time is money, any means to decrease measurement times is desirable.

Known to the art are multiple-channel plates which use a single total external reflection to focus x-ray and neutron beams, see U.S. Pat. No. 5,016,267 to Wilkins. Also known to the art are multiple-channel, multiple-total-external reflection x-ray, gamma-ray, charged particle and neutral particle, including neutron, optics which are capable of capturing such radiation from a radiation source and focusing that radiation with high intensity onto a small focal spot. See, for example, U.S. Pat. No. 5,192,869 to Kumakhov. In addition to providing large intensity gains, these optics can also provide increased spatial resolution due to a small focused radiation spot size on the sample. However, accompanying the gain in intensity is a certain amount of beam divergence; the amount of divergence depending in large part on the physical geometry of the optic. For certain applications of multiple-channel, total reflection optics, such as x-ray diffraction, and x-ray and neutron scattering, it is desirable to have high intensity radiation beams accompanied by the ability to have control over the output beam's divergence. It is also possible to use multiple-channel, total-reflection optics to form diverging radiation beams. For this case, the ability to control beam divergence would also be desirable.

Well known to the art are radiation shielding schemes and beam stops. Some of these are adjustable. See for example Japanese patent number 56-30295 (A) to Tadao Kubota. Beam stop devices are typically made of radiation absorbing materials such as lead or steel, and for the case of neutrons, materials that also contain lithium. In most, if not all implementations, their function has been to limit the spacial extent of the radiation beam. With the above background, the subject invention provides a novel use of beam stops, or shielding used in concert with multiple-channel, total-reflection optics to control the beam divergence.

OBJECT OF THE INVENTION

It is an object of the subject invention to combine radiation shielding means with multiple-channel, total reflection optics to provide focused radiation beams with a controllable amount of divergence. It is another object of the subject invention to provide an operator-defined trade-off between beam intensity and beam divergence.

SUMMARY OF THE INVENTION

Briefly summarized, the invention comprises in one aspect an apparatus for providing a focused radiation beam with a controlled divergence. This apparatus includes a multiple-channel, total-external reflection optic ("optic") and a radiation blocking structure. The optic has an input end for receiving radiation, an output end for providing the focused radiation beam and an optical axis. The radiation blocking structure is disposed at the input end of the optic for blocking radiation from reaching at least one channel of the optic such that divergence of the focused radiation beam at the output end of the optic is controlled.

In another aspect, the invention comprises a similar apparatus for providing a focused radiation beam with controlled divergence. In this similar apparatus, the radiation blocking structure is disposed at the output end of the optic such that radiation exiting at least one channel of the optic is absorbed, thereby producing the focused radiation beam with controlled divergence at the output end.

In another aspect, the invention comprises an apparatus for providing a focused radiation beam with controlled divergence that employs a radiation focusing device. The radiation focusing device has an input, an output, and an optical axis. The input is oriented to receive radiation, while the output provides the focused radiation beam with controlled divergence. The radiation focusing device includes a multiple-channel, total-external reflection optic ("optic") and a radiation blocking structure. The optic has an input end and an output end, with the input end being oriented as the input of the radiation focusing device and the output end oriented as the output of the radiation focusing device. A center axis of the optic defines the optical axis. The radiation blocking structure is disposed adjacent to either the input end or the output end of the optic such that at least one channel of the optic is blocked from contributing radiation to the focused radiation beam output from the radiation focusing device. This blocking of at least one channel of the optic controls divergence of the focused radiation beam output from the radiation focusing device.

In other aspects, methods are set forth for controlling divergence of a radiation beam. A first method includes employing a multiple-channel, total-external reflection optic ("optic") to define a radiation beam. The optic has an input end for receiving radiation and an output end for outputting the radiation beam. The method further includes blocking radiation at the input end of the optic from reaching at least one channel of the optic such that divergence of the radiation beam at the output end of the optic is controlled. In an alternative approach, the method includes absorbing radiation from at least one channel of the optic at the output end of the optic such that divergence of the radiation beam at the output end thereof is controlled.

BRIEF DESCRIPTION OF THE DRAWINGS

These and other objects, advantages and features of the present invention will be more readily understood from the following detailed description of certain preferred embodiments of the invention, when considered in conjunction with the accompanying drawings in which.

BEST MODE FOR CARRYING OUT THE INVENTION

Figure 1:
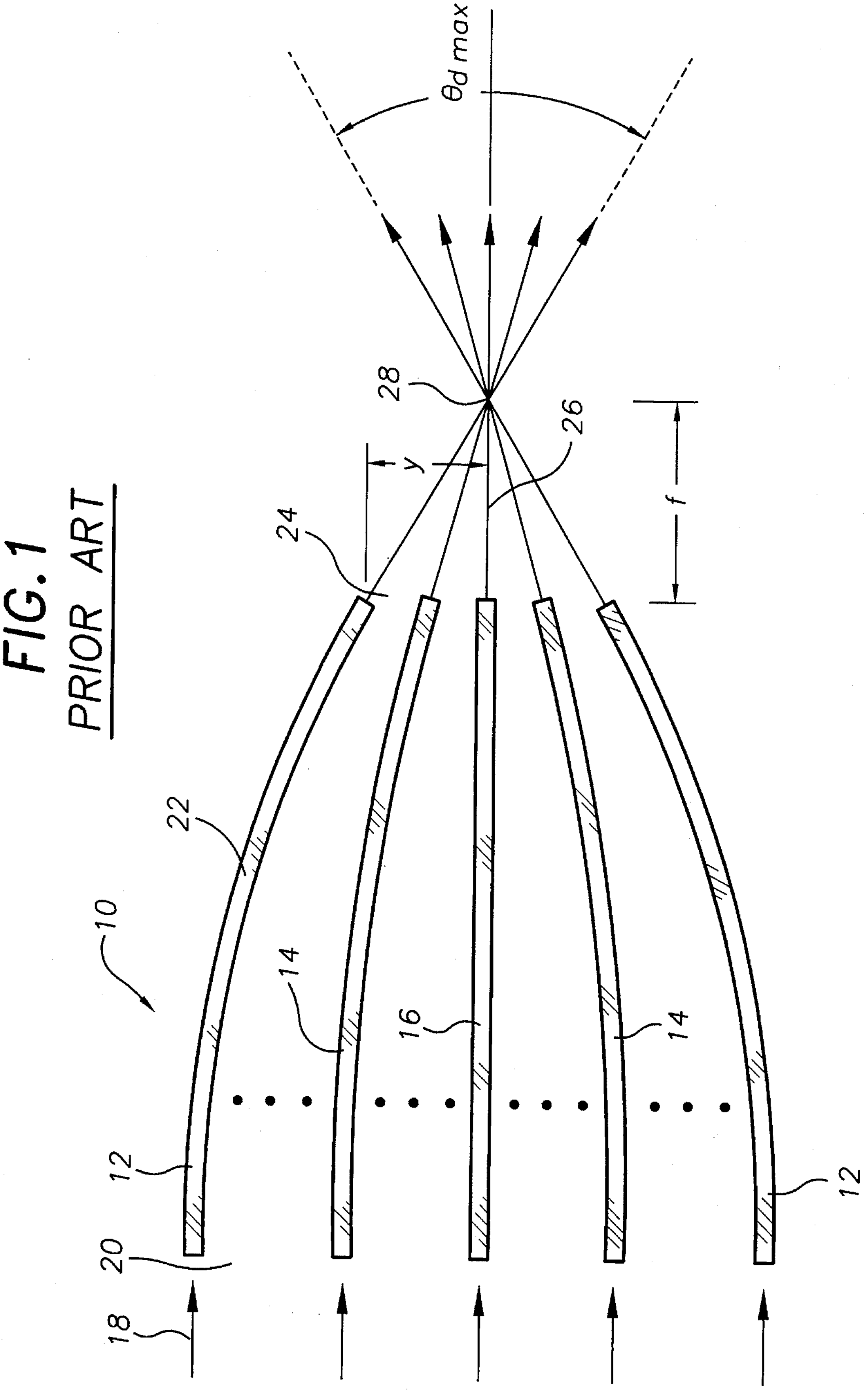
FIG. 1 PRIOR ART
FIG. 1 is a schematic diagram of a focusing multiple-channel, total reflection optic in normal operation showing the maximum divergence ANGLE $\theta_{dmax}$, of the focused beam.

The subject invention accomplishes the above-stated objects with a device which comprises a multiple-channel, total-reflection optic in combination with a radiation opaque beam stop or blocking structure. As used herein, including the appended claims, the term "radiation" shall be understood to encompass x-rays, gamma rays, charged particles and neutral paricles, including neutrons. The optic can either be a design which focuses incident radiation to a small spot, or a design which causes an incident beam to diverge in a predetermined way. In either case, anywhere from a large number of total reflections to only one may be required for the radiation to traverse the optic. In all cases, the effect of the beam stop device is to control which optic channels contribute to the output. The beam stop can be positioned between the radiation source and the optic, or it can be positioned such that the radiation interacts with the beam stop after it has traversed the optic.

The beam stop device is typically made of a radiation opaque material with an aperture which allows radiation to pass. The aperture can have various shapes depending on the application, e.g., the beam stop aperture shape might be that of a circle, slit, or rectangle. However other shapes can be used. In some cases, the beam stop device aperture shape or size might be adjustable by the user. The adjustability can take the form of a beam stop with a variable aperture, or the adjustment can be accomplished by interchanging of a series of individual beam stop devices with different fixed aperture sizes, positionings, and shapes. The beam stop device is positioned such that the aperture is "disposed about" the optic's optical axis. As used herein, the phrase "disposed about" is meant to include an aperture either intersecting or not intersecting the optical axis. For example, in certain applications it may be advantageous to allow, in succession, optic channels located at different postions within the optic to contribute radiation to the final output beam. Apertures exposing these successive optic channels may or may not intersect the optical axis, i.e., expose the optic center channel.

Normally beam stop devices are employed to control the size of a radiation beam. Surprisingly, the spatial extent, or size, of the focused spot located at the focal point of the multiple-channel, total-reflection optic is essentially unaltered by the inclusion, and placement of the described beam stop devices. The spatial extent of the focused spot is determined primarily by the widths of the output ends of the individual channels, or by the widths of individual multiple-channel bundles. For the subject invention, essentially only the divergence, and intensity of the focused beam is changed. However, when the optics which form a divergent beam are used, there can also be an accompanying change in final beam size. When used with a multiple-channel total-reflection optic, the subject invention provides a new use for beam stop devices; namely, control of beam divergence. Thus, the subject invention provides a device which is both novel, and extremely useful for radiation analysis techniques.

FIG. 1 is a schematic diagram of a focusing multiple-channel, total-reflection optic 10. Only a small representative number of the many radiation transmitting channels are shown. These include outermost channels 12, middle channels 14, and a center channel 16. Radiation 18 incident on the hollow channel portions of the input end 20 of the optic, is guided through the hollow channels as it makes successive total external reflections with the smooth inner channel walls 22. At the output end 24 of the lens, the height of the channels above the optical axis is described by distance y. The outermost channels 12 can be seen to be the maximum distance y from the optical axis 26, while the middle channels 14 are located a shorter distance from axis 26. Roughly all the channels at the output end of the optic are oriented in such a way that most of the radiation which exits the optic through the channel output ends is substantially directed at point 28 on optical axis 26. This point is known as the focal point of the optic. The distance 'f' between the output end of the lens and the focal point is called the focal length of the lens. It will be seen there is a general trend that radiation which exits channels whose output ends are located a farther distance from the optical axis cross the optical axis at the focal point with a greater angle than radiation from channels closer to the axis. These angles define the divergence of the beam at the focal point. More quantitatively, the divergence angle for a particular channel whose output channel axis is a distance y from the optical axis is given approximately by:

$$\theta_d \cong 2 \cdot \arctan\left(\frac{y}{f}\right).$$

The radiation with the maximum angle of divergence, $\theta_{dmax}$ comes substantially from the outermost channels 12. There is an additional amount of divergence of the beam which exits the fibers due to the small critical angle of reflection from the inner channel walls.

Figure 2:
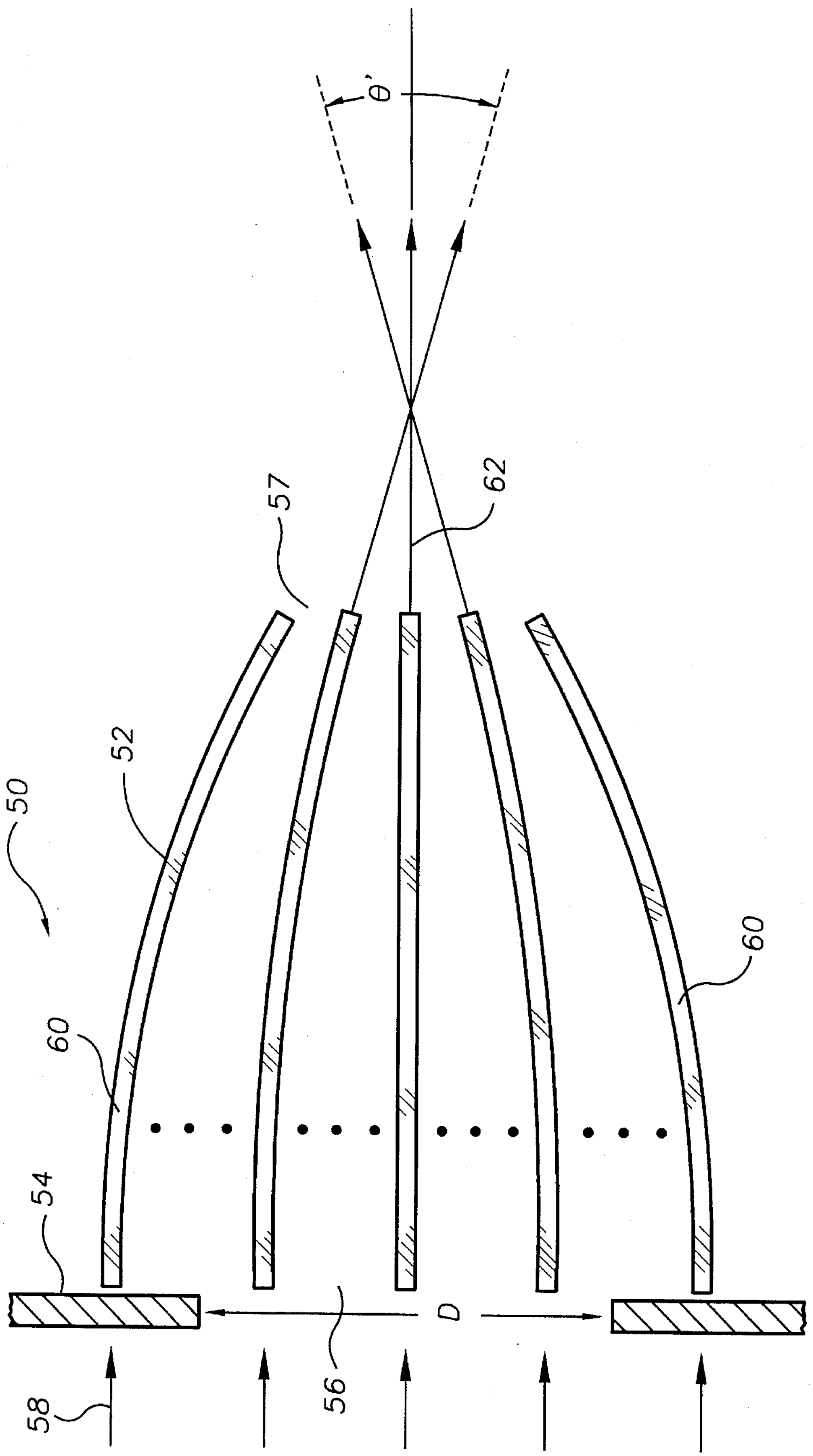
FIG. 2 is a schematic diagram of a preferred embodiment of the subject invention—a focusing optic with a beam stop device positioned before the input end of the optic which alters the divergence of the focused beam, $\theta'_d<\theta_{dmax}$.

FIG. 2 shows one embodiment of the subject invention 50, which comprises a multiple-channel, multiple-total-external reflection optic ("optic") 52 designed to focus a received, substantially parallel beam to a small region of space, and a beam stop device or radiation blocking structure 54 disposed at the input end of the optic. Other optic configurations, such as those which capture and focus divergent radiation, or which form a divergent output beam, can also be considered preferred modes depending on the application. It is often preferred that beam stop device 54 be positioned before input end 56 of the capillary optic. However, it is also possible to locate the beam stop after the optic output end, as described herein below.

The beam stop 54 is constructed of a radiation-absorbing material, such as stainless steel, and has a radiation transparent aperture of width 'D'. Radiation source properties can effect the ability of the beam stop device to stop the received parallel beam, thus, it is preferred to locate the beam stop device as close as possible, without touching, to the input end of the optic. As can be seen from the figure, the effect of the opaque portion of the beam stop device is to prevent incident radiation 58 from entering the outermost channels 60. Thus, only channels whose output ends are a shorter distance from optical axis 62 transmit incident radiation. Because no radiation passes through the outer channels, the divergence of the output beam at the focal point is determined by the channels which are closer to optical axis 62. The net effect is that by selecting which channels radiation is allowed to pass through, the divergence of the output beam at the focal point can be controlled. It is important to note that the spacial extent of the focused spot is essentially not altered by the inclusion of the beam stop device. The spacial extent of the focused spot is determined approximately by the widths of the output ends of the individual channels, or by the widths of individual multiple-channel bundles.

Although not shown in the figure, a second beam stop device could be placed some distance in front of the first. The effect of this second beam stop would be to limit the background radiation passing directly through the channel walls, from reaching the focal point area or the surrounding region.

Figure 3C:
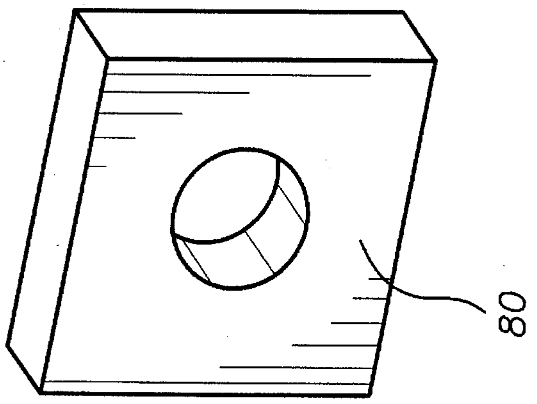
FIGS. 3*a*–3*c* are examples of an interchangeable beam stop devices of different sized apertures D to be used in conjunction with multiple-channel, total reflection optics as specified by the subject invention.
Figure 3B:
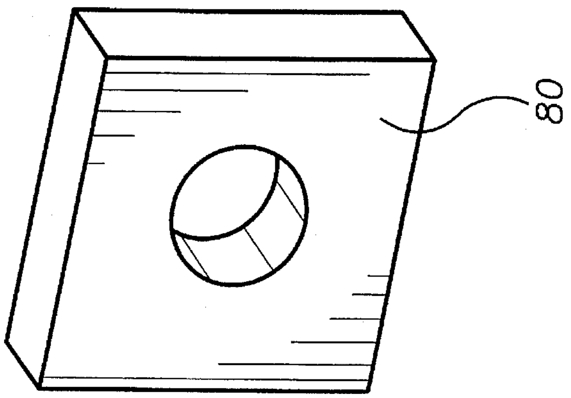
Figure 3A:
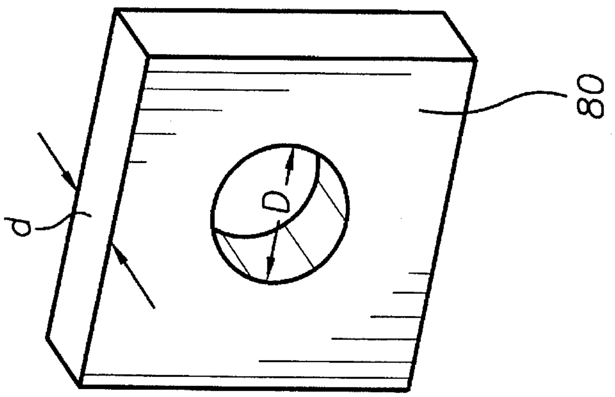

FIGS. 3*a*, 3*b* and 3*c* show a series of interchangeable beam stop devices 80 with radiation transparent apertures D of different diameters. The thicknesses, d, of the beam stops, which are sufficient to block radiation, varies with the type and energy of radiation to be blocked. For 8 keV x rays, a preferred beam stop material is stainless steel with a thickness of roughly one centimeter. For the case of cold neutrons, beam stop devices made from $^6$Li glass with a thickness of greater than approximately 3 millimeters are preferred. As mentioned before, other aperture configurations, such as square, or rectangular shapes, and other construction materials may also be preferred for particular applications.

Figure 4:
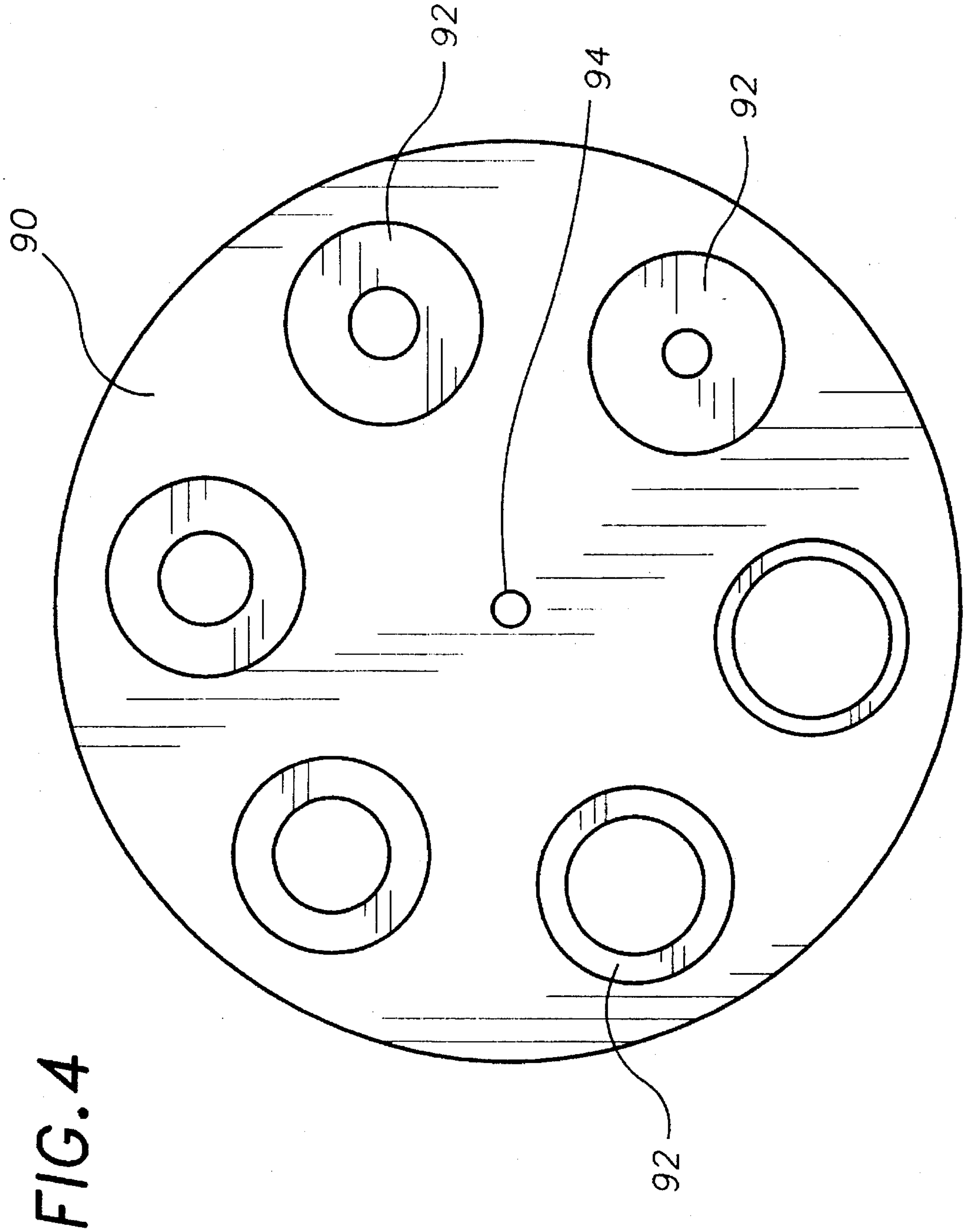
FIG. 4 are interchangeable beam stop devices of the subject invention placed on a rotatable wheel to enable easy beam stop aperture change.

Shown in FIG. 4 is a radiation opaque rotatable wheel 90, which contains a plurality individual beam stop devices 92 each having a different aperture width. The wheel turns about an axis 94. Any particular beam stop can be chosen by rotating it into position. There is further flexibility in beam stop aperture size available to the user because individual stops can be removed and replaced on the wheel.

Figure 5:
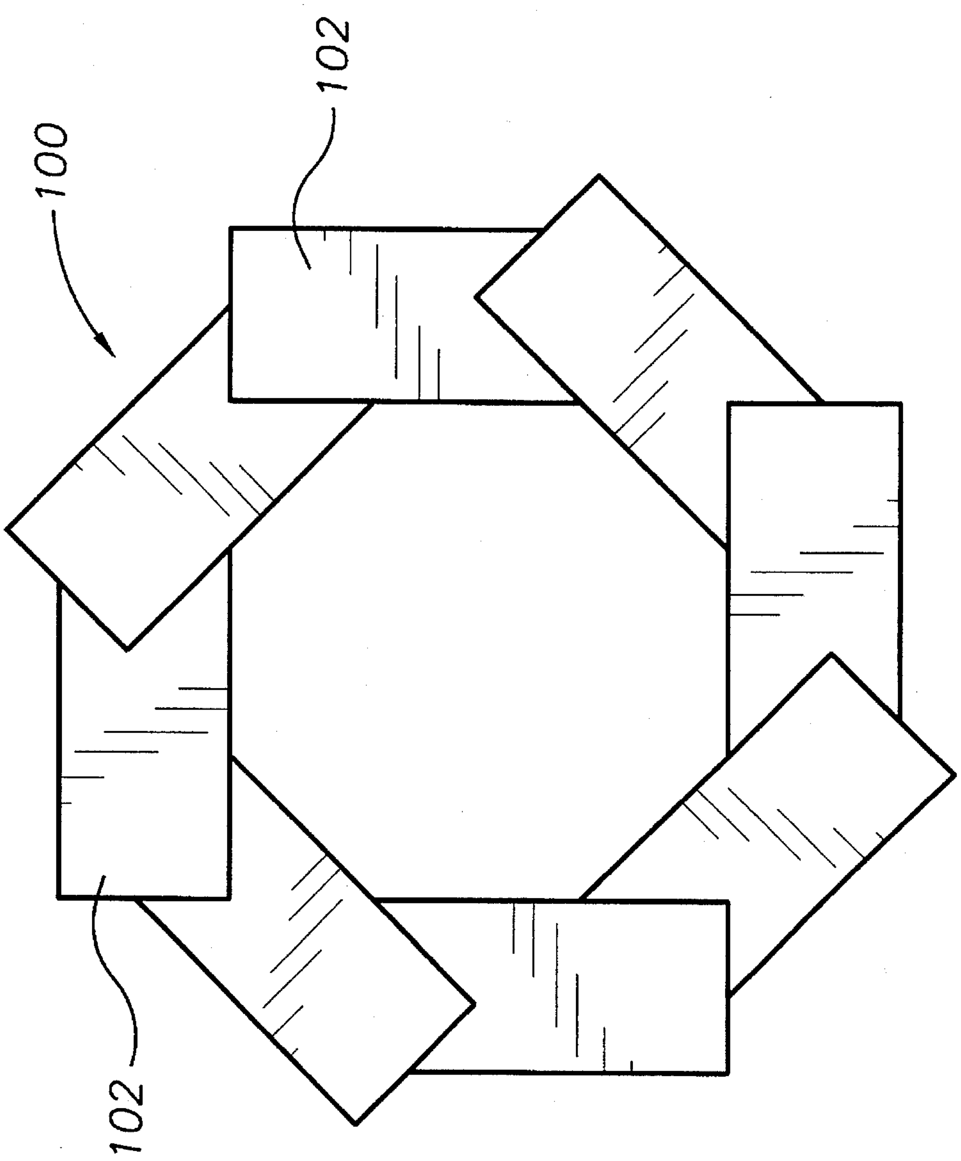
FIG. 5 is an example of a preferred adjustable beam stop device of the subject invention.

Sometimes situations arise in the use of multiple-channel, total-reflection optics where it is desirable to have finer control over which channels of the optic contribute to the final focused output beam than is possible with interchangeable beam stop devices. For these situations the ability to essentially continuously vary the transmitting aperture width, and/or shape, of the beam stop device is preferred. FIG. 5 shows a beam stop device 100 with pivoting leaves 102 which form a continuously variable aperture width for use with x rays. Again, it is preferred that the radiation blocking portions be constructed of stainless steel and of sufficient thickness to block x rays with the particular energy for the desired application. If thinner leaves are required, then the stainless steel can be coated with lead or other more absorptive material. The leaves themselves can also be constructed of other more absorptive materials. Adjustments to the aperture width can be done manually, or by a motor.

Figure 6:
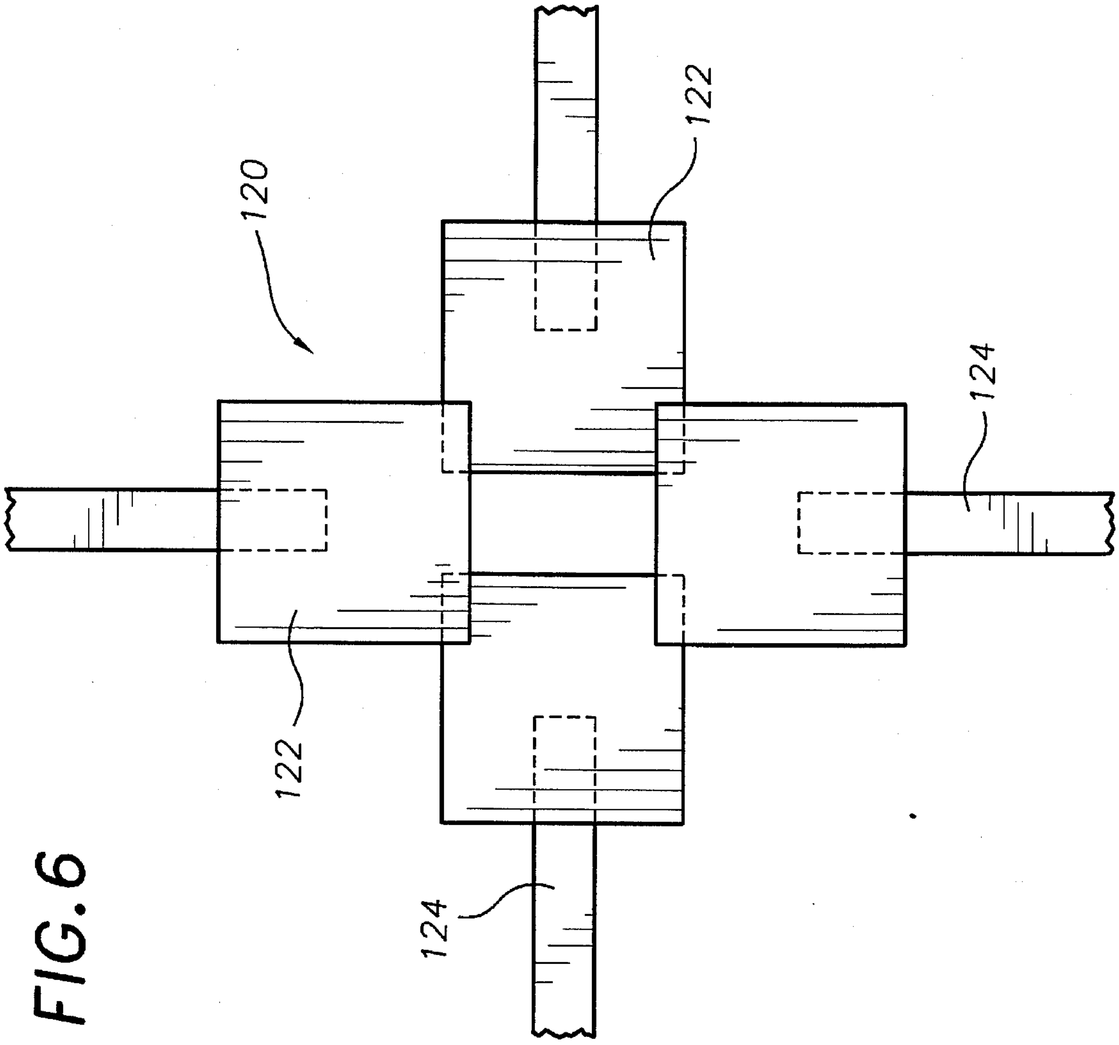
FIG. 6 is an example of another preferred adjustable rectangular-shaped beam stop device.

FIG. 6 shows an adjustable beam stop device 120 that can be used in the subject invention. For applications involving neutrons, the radiation blocking portions 122 of this beam stop can be made from $^6$Li glass plates, which are slidably connected to cross pieces 124 to allow continuous adjustment. $^6$Li glass is a preferred neutron blocking material for use in combination with multiple-channel, total-reflection optics because, in a preferred embodiment, the optics themselves are made of glass. Since both beam stop and optic are constructed of substantially the same material, contamination complications due to secondary radiation such as gamma rays are kept to a minimum. For x radiation, the beam-blocking plates can be made from stainless steel, lead, or other radiation opaque materials. The plates are independently and slidably adjustable. In this configuration, not only is the area of the radiation transmitting aperture variable, but also its shape can change.

Figure 7:
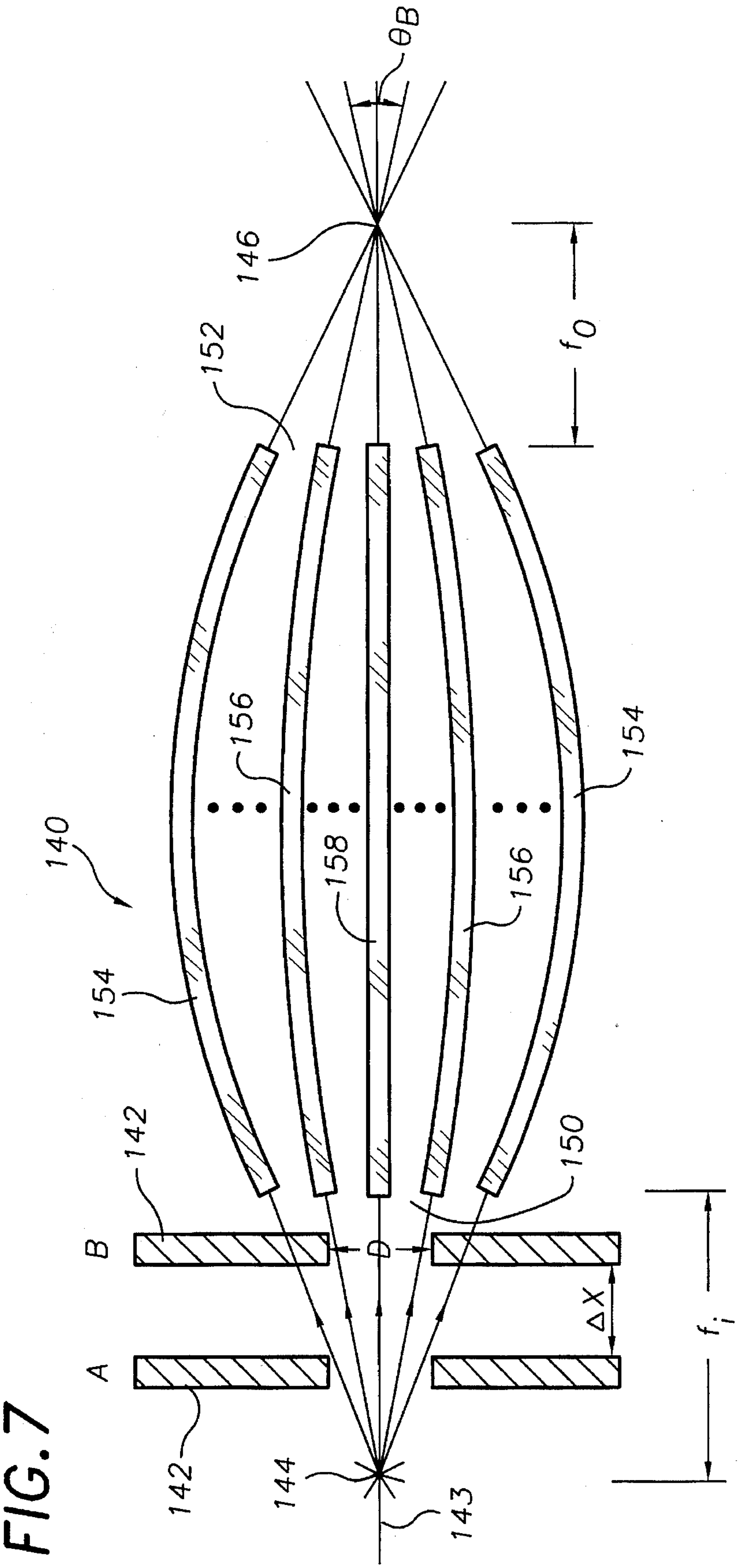
FIG. 7 is an embodiment of the subject invention whereby the effective radiation-transparent aperture of a single beam stop device is varied by changing the beam stop position along an optical axis.

Yet another embodiment of the subject invention which provides essentially continuous adjustability of the effective radiation-transmitting aperture width of a beam stop device is illustrated in FIG. 7. Shown is multiple-channel, total-reflection optic 140, and a single beam stop device 142. Two separate positions of the same beam stop device, which is slidably adjustable along optical axis 143, are shown. The optic configuration in this example is designed to capture radiation from an approximate point source of radiation 144, and to focus that radiation to a small spot 146. Radiation source 144 is located at the input focal point of the optic, which is located a distance $f_i$, know as the input focal length, from the input end 150 of the optic. The distance $f_o$ from the optic output end 152 to small focused spot 146 is called the output focal length. Only a few of the many channels of optic 140 are shown, including a pair of outermost channels 154; a pair of middle channels 156; and a central channel 158. It will be seen that when beam stop device 142 is in position A, all the channels of the optic are illuminated by the incident radiation from radiation source 144. Accompanying this maximum channel illumination is a maximum divergence of the focused beam. This maximum divergence is labeled $\theta_A$ in the figure. When beam stop device 142 is moved to position B, radiation can no longer enter the outermost channels 154 of the optic. Since these channels no longer contribute to the over all optic output, the divergence angle of the focused radiation beam at the focal point is reduced to $\theta_B$. The distance of maximum travel of beam stop device 142 along axis 143 is determined as the distance from a point A, where all the optic channels are just illuminated, to a point B, where the beam stop is nearly touching the optic input. In this way, although the radiation-transparent width of the beam stop device remains constant at D, its effective width can be continuously varied.

Figure 8:
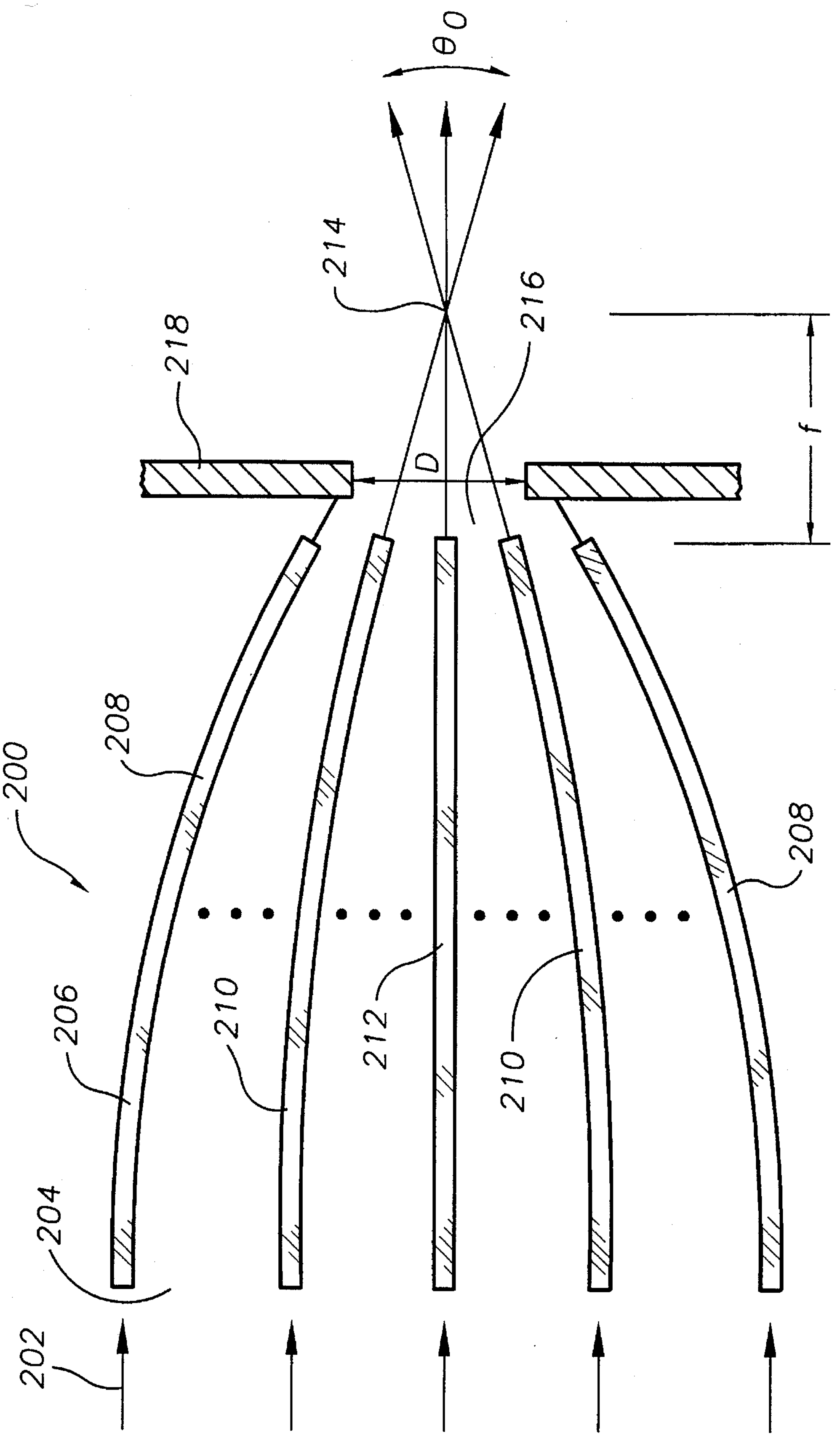
FIG. 8 is an embodiment of the subject invention in which the beam stop device is located after the output end of the multiple-channel, total-reflection optic.

Alternatively, the beam stop device can be located after the output end of the lens. FIG. 8 shows a schematic representation of just such an embodiment 200, of the subject invention. Radiation 202 is incident on the input end 204 of multiple-channel, total-reflection optic 206. Again, only a few representative channels of the many present are pictured. A pair of outermost channels 208, a pair of middle channels 210, and a center channel 212 are shown. Optic 206 of this example is designed to capture a substantially parallel beam of radiation and focus it to a small spot 214, known as the focal point, located a focal distance f from output end 216 of the optic. Beam stop device 218, is located in close proximity to the output end 216 of optic 206. Beam stop device 218 can be constructed of a radiation-opaque material of appropriate thickness to efficiently block radiation of the desired type and energy. Beam stop device 218 also has a radiation-transparent aperture of width D. It can be seen from the figure that the effect of beam stop device 218 is to prevent radiation from outermost channels 208 from contributing to the radiation which passes through focal point 214. This again has the effect of changing the divergence of the focused radiation beam. In this embodiment it is desirable to locate the beam stop device as close as possible to, but without touching, output end 216 of the optic.

Figure 9:
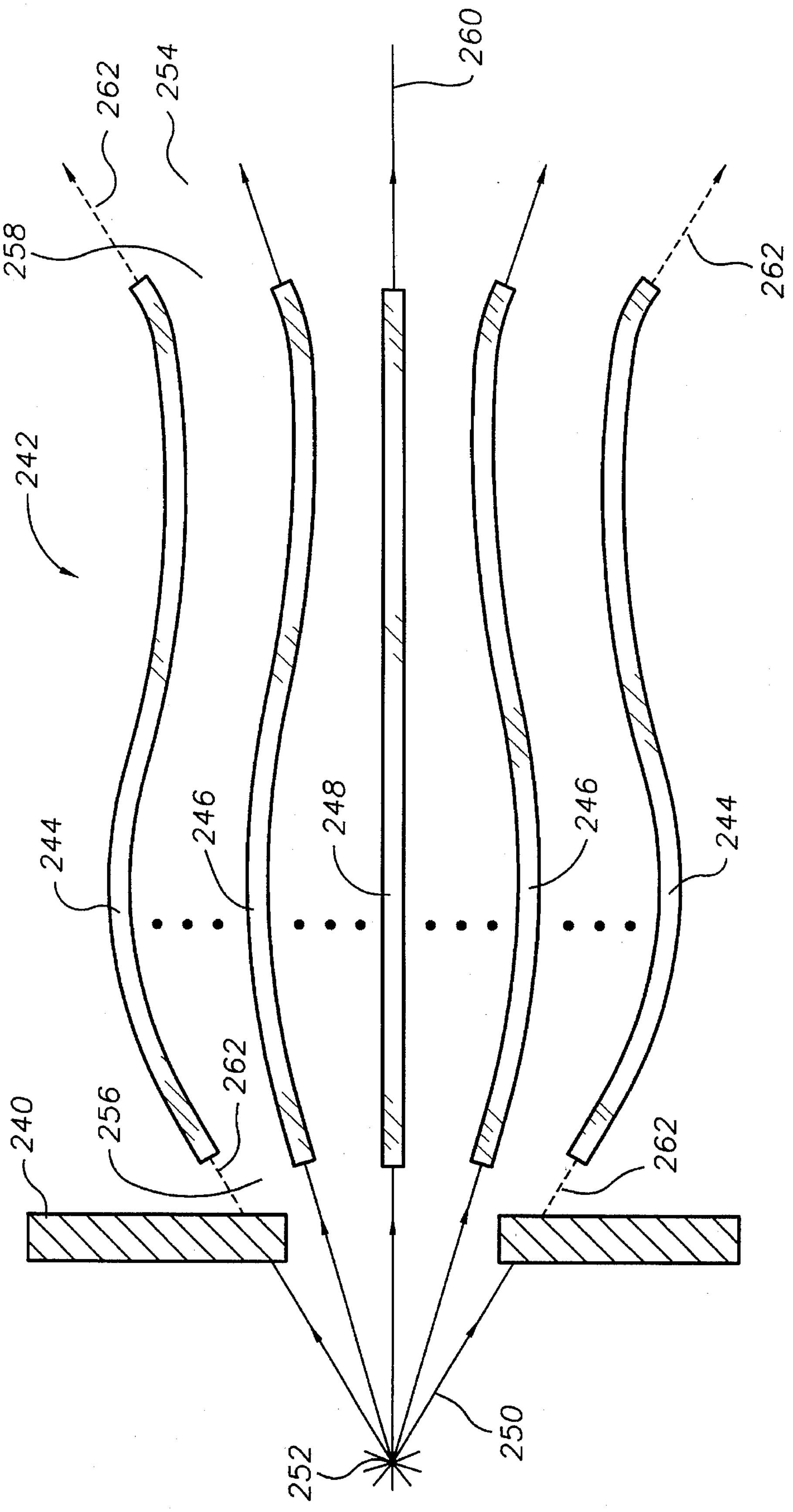
FIG. 9 is an embodiment of the subject invention in which divergence of a diverging radiation beam at the output end of the optic is controlled.

Yet another alternative embodiment of the subject invention, shown in FIG. 9, comprises a beam stop device 240, and a multi-channel, multiple-reflection optic 242. Again, only a few of the many optic channels are shown; i.e., a pair of outermost channels 244, a pair of intermediate channels 246, and the central channel 248. Optic 242 is designed to efficiently capture radiation 250, from divergent source 252, and to form output beam 254 with a controlled amount of divergence. Divergence of the output beam can be defined as the angle the output radiation makes with optical axis 260. The channels at the optic input end 256 all essentially aim at the radiation source 252. It will be seen from the figure that at output end 258 of optic 242, the divergence of the output beam 254 is dependent on the distance of the radiation transmitting channels from optical axis 260; with the larger the distance, the more divergent the output radiation. Beam stop device 240 is disposed in close proximity to optic input end 256, such that radiation is prevented from entering outermost channels 244. the dashed radiation lines 262, indicate the path radiation would take if the beam stop device was not present. By selectively choosing which optic channels contribute to the final output radiation beam, the divergence of the output beam can be controlled.

Upon reading the above specification, variations and alternative embodiments will become obvious to those skilled in the art and are to be considered within the scope and spirit of the subject invention. The subject invention is only to be limited by the claims which follow and their equivalents.

We claim:

1. An apparatus for providing a focused radiation beam with controllable convergence, said apparatus comprising:

a multiple-channel, total-external reflection optic ("optic") having an input end for receiving radiation, an output end for providing said focused radiation beam, and an optical axis, said focused radiation beam having an angle of convergence at a focal spot a focal length from the output end of said optic; and means for varying the angle of convergence of the focused radiation beam without effecting focal spot size or said focal length of said focal spot from said output end of said optic, said means for varying the angle of convergence comprising a radiation blocking structure disposed at said input end of said optic for blocking radiation from reaching at least some channels of said optic such that said angle of convergence of said focused radiation beam at said focal spot spaced said focal length from the output end of said optic is variably controlled.

2. The apparatus of claim 1, wherein said radiation blocking structure includes a radiation transmitting portion, said radiation transmitting portion being disposed about said optical axis of said optic.

3. The apparatus of claim 2, wherein said radiation blocking structure comprises multiple radiation transmitting portions, said radiation transmitting portion disposed about said optical axis comprising one radiation transmitting portion of said multiple radiation transmitting portions, each radiation transmitting portion having one of a unique size and a unique shape, wherein said radiation blocking structure is movable for disposition of any one radiation transmitting portion of said multiple radiation transmitting portions about the optical axis, wherein different radiation transmitting portions of said multiple radiation transmitting portions effectuate different angles of convergence of the focused radiation beam at the focal spot said focal length from the output end of the optic.

4. The apparatus of claim 2, wherein said radiation blocking structure is movable along said optical axis, relative to said input end of said optic, such that said radiation blocking structure blocks radiation from reaching different channels of said optic depending upon spacial disposition thereof along said optical axis relative to the input end of said optic, thereby affecting said angle of convergence of the focused radiation beam at the focal spot said focal length from the output end of the optic.

5. The apparatus of claim 1, wherein said radiation blocking structure comprises a radiation transmitting portion disposed about the optical axis, said radiation transmitting portion having at least one of an adjustable size and an adjustable shape such that said radiation transmitting portion disposed about said optical axis is variable within a predetermined range.

6. The apparatus of claim 5, wherein said radiation blocking structure comprises a plurality of adjustable opaque sections, each adjustable opaque section being capable of blocking radiation, said plurality of adjustable opaque sections cooperating to define said radiation transmitting portion, wherein adjustment of said plurality of adjustable opaque sections varies at least one of the size and the shape of said radiation transmitting portion disposed about said optical axis.

7. The apparatus of claim 1, further comprising a plurality of radiation blocking structures, wherein said radiation blocking structure comprises one radiation blocking structure of said plurality of radiation blocking structures, each radiation blocking structure having a radiation transmitting portion of unique size or shape disposed such that when positioned at said input end of said optic, said radiation transmitting portion is disposed about said optical axis and said radiation blocking structure can block radiation from reaching at least some channels of said optic, thereby controlling the angle of convergence of said focused radiation beam at said focal point spaced said focal length from said output end of said optic.

8. An apparatus for providing a focused radiation beam having a controlled convergence, said apparatus comprising:

a multiple-channel, total-external reflection optic ("optic") having an input end for receiving radiation, an output end for providing said focused radiation beam, and an optical axis, said focused radiation beam having an angle of convergence at a focal spot a focal length from the output end of said optic; and means for varying the angle of convergence of the focused radiation beam without effecting focal spot size or said focal length of said focal spot from said output end of said optic, said means for varying the angle of convergence comprising a radiation absorbing structure disposed at said output end of said optic for absorbing radiation exiting at least some channels of said optic such that said angle of convergence of said focused radiation beam at said focal spot spaced said focal length from the output end of said optic is variably controlled.

9. The apparatus of claim 8, wherein said radiation absorbing structure includes a radiation transmitting portion, said radiation transmitting potion being disposed about said optical axis of said optic.

10. An apparatus for providing a focused radiation beam with variable convergence, said apparatus comprising:

a radiation focusing device having an input, an output, and an optical axis, said input being oriented to receive radiation, said output providing said focused radiation beam with said variable convergence at a focal spot a focal length from the output end of said optic, said radiation focusing device further comprising a multiple-channel, total-external reflection optic ("optic") having an input end and an output end, said input end being oriented as said input of said radiation focusing device and said output end being oriented as said output of said radiation focusing device, a center axis of said optic defining said optical axis, and means for varying an angle of convergence of the focused radiation beam at the focal spot without effecting focal spot size or said focal length of said focal spot from said output end of said optic, said means for varying the angle of convergence comprising a radiation blocking structure disposed adjacent to one of the input end and the output end of said optic, said radiation blocking structure being such that at least some channels of said multiple-channel, total-external reflection optic are blocked from contributing radiation to the focused radiation beam output from said radiation focusing device, wherein blocking of said at least some channels of said optic controls the angle of convergence of said focused radiation beam at said focal spot spaced said focal length from the output of said radiation focusing device.

11. The apparatus of claim 10, wherein said radiation blocking structure includes a radiation transmitting portion, said radiation transmitting portion being disposed about said optical axis.

12. The apparatus of claim 11, wherein said radiation blocking structure comprises multiple radiation transmitting portions, said radiation transmitting portion disposed about said optical axis comprising one radiation transmitting portion of said multiple radiation transmitting portions, each radiation transmitting portion having one of a unique size and a unique shape, wherein said radiation blocking structure is movable for disposition of any one radiation transmitting portion of said multiple radiation transmitting portions with the optical axis, wherein different radiation transmitting portions of said multiple radiation transmitting portions effectuate different angles of convergence of the focused radiation beam at the focal spot said focal length from the output of said radiation focusing device.

13. The apparatus of claim 11, wherein said radiation blocking structure is movable along said optical axis, relative to one of said input end and said output end of said optic, such that said radiation blocking structure blocks radiation from different channels of said optic depending upon spacial disposition thereof along said optical axis relative to said one of said input end and said output end of said optic, thereby affecting said angle of convergence of the focused radiation beam at the focal spot said focal length from the output of the radiation focusing device.

14. The apparatus of claim 11, wherein said radiation transmitting portion has at least one of an adjustable size and an adjustable shape such that said radiation transmitting portion intersecting said optical axis is variable within a predetermined range.

15. The apparatus of claim 14, wherein said radiation blocking structure comprises a plurality of adjustable opaque sections, each adjustable opaque section being capable of blocking radiation, said plurality of adjustable opaque sections cooperating to define said radiation transmitting portion, wherein adjustment of said plurality of adjustable opaque sections varies at least one of the size and the shape of said radiation transmitting portion disposed about said optical axis.

16. The apparatus of claim 10, wherein said means for varying the angle of convergence further comprises a plurality of radiation blocking structures, said radiation blocking structure comprising one radiation blocking structure of said plurality of radiation blocking structures, each radiation blocking structure having a radiation transmitting portion of unique size or shape disposed such that when positioned at one of said input end and said output end of said optic, said radiation transmitting portion is disposed about said optical axis and said radiation blocking structure blocks at least some channels of said optic from contributing radiation to the focused radiation beam output from the radiation focusing device such that said angle of convergence of said focused radiation beam at said focal spot disposed said focal length from the output of said radiation focusing device is controlled.

17. A method for controlling convergence of a radiation beam, said method comprising the steps of:

(a) employing a multiple-channel, total-external reflection optic ("optic") to define said radiation beam, said optic having an input end for receiving radiation, and an output end for outputting said radiation beam, said optic being designed such that said radiation beam has an angle of convergence at a focal spot a focal length from the output end of the optic; and (b) blocking radiation at said input end of said optic from reaching at least some channels of said optic such that said angle of convergence of the radiation beam at said focal spot is varied without varying said focal length of said focal spot from the output end of the optic.

18. A method for controlling convergence of a radiation beam, said method comprising the steps of:

(a) employing a multiple-channel, total-external reflection optic ("optic") to define the radiation beam, said optic having an input end for receiving radiation and an output end for outputting said radiation beam, said optic being designed such that said radiation beam has an angle of convergence at a focal spot a focal length from the output end of the optic; and (b) absorbing radiation from at least some channels of said optic at the output end of said optic such that said angle of convergence of the radiation beam at said focal spot is varied without varying said focal length of said focal spot from said output end of said optic.

* * * * *